United States Patent
Wong et al.

(10) Patent No.: US 8,896,144 B2
(45) Date of Patent: Nov. 25, 2014

(54) WIND TURBINE ENERGY STORAGE SYSTEM AND METHOD

(76) Inventors: Carlos Wong, Macau (MO); Livia Wong, Macau (MO); Zhaohui Xiong, Harbin (CN)

(*) Notice: Subject to any disclaimer, the term of this patent is extended or adjusted under 35 U.S.C. 154(b) by 515 days.

(21) Appl. No.: 12/912,793

(22) Filed: Oct. 27, 2010

(65) Prior Publication Data
US 2012/0107149 A1 May 3, 2012

(51) Int. Cl.
*F03D 9/02* (2006.01)
*F03D 7/02* (2006.01)
*F16D 31/02* (2006.01)
*F03D 9/00* (2006.01)

(52) U.S. Cl.
CPC ............ *F03D 9/028* (2013.01); *F03D 9/001* (2013.01); *Y02E 10/726* (2013.01); *Y02E 60/17* (2013.01); *Y02E 60/15* (2013.01)
USPC ............. 290/55; 290/44; 415/4.3; 415/4.5; 60/398

(58) Field of Classification Search
CPC ...... Y02E 10/72; Y02E 10/722; Y02E 10/726
USPC ........... 417/336, 334; 290/44, 55, 54; 60/407, 60/398; 416/6; 415/4.3, 4.5
See application file for complete search history.

(56) References Cited

U.S. PATENT DOCUMENTS

| | | | | | |
|---|---|---|---|---|---|
| 1,035,431 | A | * | 8/1912 | Ericson | 417/336 |
| 1,211,161 | A | * | 1/1917 | Jikihara | 417/1 |
| 1,254,737 | A | * | 1/1918 | Smithey | 417/336 |
| 2,112,633 | A | * | 3/1938 | Moon | 290/55 |
| 2,230,526 | A | * | 2/1941 | Claytor | 290/44 |
| 2,285,775 | A | * | 6/1942 | Keele | 290/4 D |
| 2,454,058 | A | * | 11/1948 | Hays | 60/398 |
| 2,485,543 | A | * | 10/1949 | Andreau | 60/398 |
| 2,539,862 | A | * | 1/1951 | Rushing | 62/230 |
| 3,099,220 | A | * | 7/1963 | Butman | 417/336 |
| 3,561,890 | A | * | 2/1971 | Peterson | 417/336 |
| 3,806,733 | A | * | 4/1974 | Haanen | 290/55 |
| 3,952,723 | A | * | 4/1976 | Browning | 126/247 |
| 4,008,006 | A | * | 2/1977 | Bea | 417/271 |
| 4,055,950 | A | * | 11/1977 | Grossman | 60/398 |
| 4,068,131 | A | * | 1/1978 | Jacobs et al. | 290/55 |
| 4,236,083 | A | * | 11/1980 | Kenney | 290/55 |
| 4,340,822 | A | * | 7/1982 | Gregg | 290/55 |
| 4,385,871 | A | * | 5/1983 | Beisel | 417/334 |
| 4,447,738 | A | * | 5/1984 | Allison | 290/44 |
| 4,455,834 | A | * | 6/1984 | Earle | 60/659 |
| 4,476,851 | A | * | 10/1984 | Brugger et al. | 126/247 |
| 4,565,929 | A | * | 1/1986 | Baskin et al. | 290/44 |
| 4,648,801 | A | * | 3/1987 | Wilson | 416/171 |
| 4,792,700 | A | * | 12/1988 | Ammons | 290/55 |
| 5,042,520 | A | * | 8/1991 | Reznik | 137/79 |
| 5,076,312 | A | * | 12/1991 | Powell | 137/68.25 |

(Continued)

*Primary Examiner* — Devon C. Kramer
*Assistant Examiner* — Alexander Comley
(74) *Attorney, Agent, or Firm* — Matthew J. Lattig; Charter IP, LLC

(57) ABSTRACT

A wind turbine energy storage system includes a hollow wind turbine tower shaft having a top end and a bottom end covered by top and bottom end caps respectively to form a tank. A compressor is coupled to the wind turbine for compressing air into the tank through a high pressure pipe and valve assembly. The compressed air stored in the tank can be released on demand or on a fixed schedule. A method of storing energy in a wind turbine is also disclosed.

24 Claims, 4 Drawing Sheets

(56) References Cited

U.S. PATENT DOCUMENTS

| | | | |
|---|---|---|---|
| 5,299,397 A * | 4/1994 | Ahern | 52/98 |
| 5,562,455 A * | 10/1996 | Kirby et al. | 434/226 |
| 5,599,172 A * | 2/1997 | McCabe | 417/334 |
| 6,360,914 B1 * | 3/2002 | Frank et al. | 222/3 |
| 6,532,700 B1 * | 3/2003 | Maliszewski et al. | 52/40 |
| 6,699,019 B2 * | 3/2004 | Myers et al. | 417/334 |
| 7,276,808 B2 * | 10/2007 | Weitkamp et al. | 290/55 |
| 7,325,574 B1 * | 2/2008 | Beckey | 138/93 |
| 7,550,863 B2 * | 6/2009 | Versteegh | 290/44 |
| 7,719,127 B2 * | 5/2010 | Bertolotti | 290/44 |
| 7,845,693 B2 * | 12/2010 | Li et al. | 292/288 |
| 7,850,418 B2 * | 12/2010 | Niehues | 415/121.3 |
| 2005/0275225 A1 * | 12/2005 | Bertolotti | 290/44 |
| 2006/0137348 A1 * | 6/2006 | Pas | 60/641.1 |
| 2006/0267348 A1 * | 11/2006 | Weitkamp et al. | 290/55 |
| 2007/0102938 A1 * | 5/2007 | Poole | 290/55 |
| 2007/0187956 A1 * | 8/2007 | Wobben | 290/55 |
| 2007/0296220 A1 * | 12/2007 | Kristensen | 290/55 |
| 2008/0050234 A1 * | 2/2008 | Ingersoll et al. | 416/132 B |
| 2008/0211234 A1 * | 9/2008 | Grassi | 290/55 |
| 2008/0272604 A1 * | 11/2008 | Versteegh | 290/55 |
| 2008/0289352 A1 * | 11/2008 | Parent | 62/291 |
| 2009/0021012 A1 * | 1/2009 | Stull et al. | 290/44 |
| 2009/0096213 A1 * | 4/2009 | Berglund | 290/44 |
| 2009/0230692 A1 * | 9/2009 | Lopez | 290/55 |
| 2009/0284012 A1 * | 11/2009 | Mortensen | 290/44 |
| 2009/0294219 A1 * | 12/2009 | Oliphant et al. | 187/242 |
| 2010/0060013 A1 * | 3/2010 | Csefko | 290/55 |
| 2010/0076614 A1 * | 3/2010 | Nies et al. | 700/287 |
| 2010/0090479 A1 * | 4/2010 | Li et al. | 292/302 |

* cited by examiner

WIND TURBINE ENERGY STORAGE SYSTEM AND METHOD

FIELD OF THE APPLICATION

The present application relates to a wind turbine energy storage system and a method of storing energy in a wind turbine.

BACKGROUND

Wind energy is intermittent and does not always match the electricity demand. To solve this problem, the electricity output of a wind turbine is limited within a narrow range of wind speed spectrum.

There is a need to produce an energy storage system to store the wind energy and to release it when needed. This can improve the efficiency of wind turbine and is possible to match the electricity generation with demand.

The above description of the background is provided to aid in understanding a wind turbine, but is not admitted to describe or constitute pertinent prior art to the wind turbine disclosed in the present application, or consider any cited documents as material to the patentability of the claims of the present application.

SUMMARY

According to one aspect, there is provided a wind turbine energy storage system including:
 a hollow wind turbine tower shaft having a top end and a bottom end; top and bottom end caps covering the top and bottom ends of the tower shaft respectively to form a tank; and
 a compressor coupled to the wind turbine for compressing air into the tank;
 wherein compressed air stored in the tank is adapted to be released on demand or on a fixed schedule.

In one embodiment, the first and second end caps are hemispherical in shape.

In one embodiment, the hollow wind turbine tower shaft is generally cylindrical in shape.

In one embodiment, the hollow wind turbine tower shaft tapers upwards, and the dimension of the bottom end cap is larger than the dimension of the top end cap.

In one embodiment, the tower shaft further includes a top hollow tower shaft extension connected to and extending upwardly from the top end of the tower shaft, and wherein a nacelle and a plurality of turbine blades of the wind turbine are supported on the top hollow tower shaft extension.

In one embodiment, the tower shaft further includes a bottom hollow tower shaft extension connected to and extending downwardly from the bottom end of the tower shaft for supporting the tower shaft.

In one embodiment, the bottom hollow tower shaft extension is stiffened by a plurality of vertical plates fixed around an outer surface of the bottom hollow tower shaft extension, and wherein the bottom hollow tower shaft extension and the vertical plates are welded on a bearing ring plate which is fixed on top of a concrete pile cap by a plurality of anchor bars, and the concrete pile cap is in turn supported on a plurality of vertical concrete piles embedded in the ground.

The system further includes a high pressure pipe and valve assembly through which air is delivered from the compressor into the tank.

The system further includes a turbo expander-generator to which compressed air in the tank is fed through a high pressure pipe.

The system further includes a top access door provided on the top end cap, wherein the top access door is a one-way hinged door movable inwards when the air pressure inside the tank is the same as the outside atmospheric pressure.

In one embodiment, the top end cap is provided with a circular opening reinforced by a ring beam fixed thereto, and the top access door is adapted to cover the circular opening.

The system further includes a bottom access door provided on the tower shaft at the bottom end thereof, wherein the bottom access door is a one-way hinged door movable inwards when the air pressure inside the tank is the same as the outside atmospheric pressure.

The system further includes a bottom working platform mounted inside the tower shaft at the bottom end thereof, and the bottom working platform being accessible from the bottom access door.

The system further includes a plurality of horizontal working platforms mounted at different levels inside the tower shaft, and the plurality of horizontal working platforms is supported by a plurality of brackets fixed on an inner surface of the tower shaft.

The system further includes a ladder extending from the ground, leading to the working platforms, up to an access door provided on the top end cap and into a nacelle of the wind turbine.

The system further includes a pressure gauge provided on the tank for releasing compressed air therefrom when the air pressure in the tank reaches a first preset limit.

The system further includes a built-in weak point formed on the tank, wherein the weak point breaks to release the compressed air in the tank when the air pressure in the tank reaches a second preset limit that is higher than the first preset limit.

In one embodiment, the hollow wind turbine tower shaft and the top and bottom end caps are made of steel.

According to another aspect, there is provided a method of storing energy in a wind turbine including the steps of:
 (a) providing a hollow wind turbine tower shaft having a top end and a bottom end covered by top and bottom end caps respectively to form a tank;
 (b) compressing air into the tank through a high pressure pipe and valve assembly by a compressor that is driven by the wind turbine; and
 (c) storing the compressed air in the tank so that the stored compressed air which is adapted to be released on demand or on a fixed schedule.

In one embodiment, the step (b) includes the step of directly driving the compressor by the wind turbine.

In one embodiment, the step (b) includes the step of driving an electric compressor by electricity generated by the wind turbine.

The method further includes the step of releasing the compressed air in the tank through a pressure gauge when the air pressure in the tank reaches a first preset limit.

The method further includes the step of breaking a built-in weak point formed on the tank so as to release the compressed air in the tank when the air pressure in the tank reaches a second preset limit that is higher than the first preset limit.

The method further includes the step of providing a turbo expander-generator to which the compressed air in the tank is fed through a high pressure pipe.

Although the wind turbine disclosed in the present application is shown and described with respect to certain embodiments, it is obvious that equivalents and modifications will occur to others skilled in the art upon the reading and understanding of the specification. The present application includes all such equivalents and modifications, and is limited only by the scope of the claims.

BRIEF DESCRIPTION OF THE DRAWINGS

Specific embodiments of the wind turbine disclosed in the present application will now be described by way of example with reference to the accompanying drawings wherein.

DETAILED DESCRIPTION

Reference will now be made in detail to a preferred embodiment of the wind turbine disclosed in the present application, examples of which are also provided in the following description. Exemplary embodiments of the wind turbine disclosed in the present application are described in detail, although it will be apparent to those skilled in the relevant art that some features that are not particularly important to an understanding of the wind turbine may not be shown for the sake of clarity.

Furthermore, it should be understood that the wind turbine disclosed in the present application is not limited to the precise embodiments described below and that various changes and modifications thereof may be effected by one skilled in the art without departing from the spirit or scope of the appended claims. For example, elements and/or features of different illustrative embodiments may be combined with each other and/or substituted for each other within the scope of this disclosure and appended claims.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element, or is in mechanical or electrical communication with another element.

Figure 1:
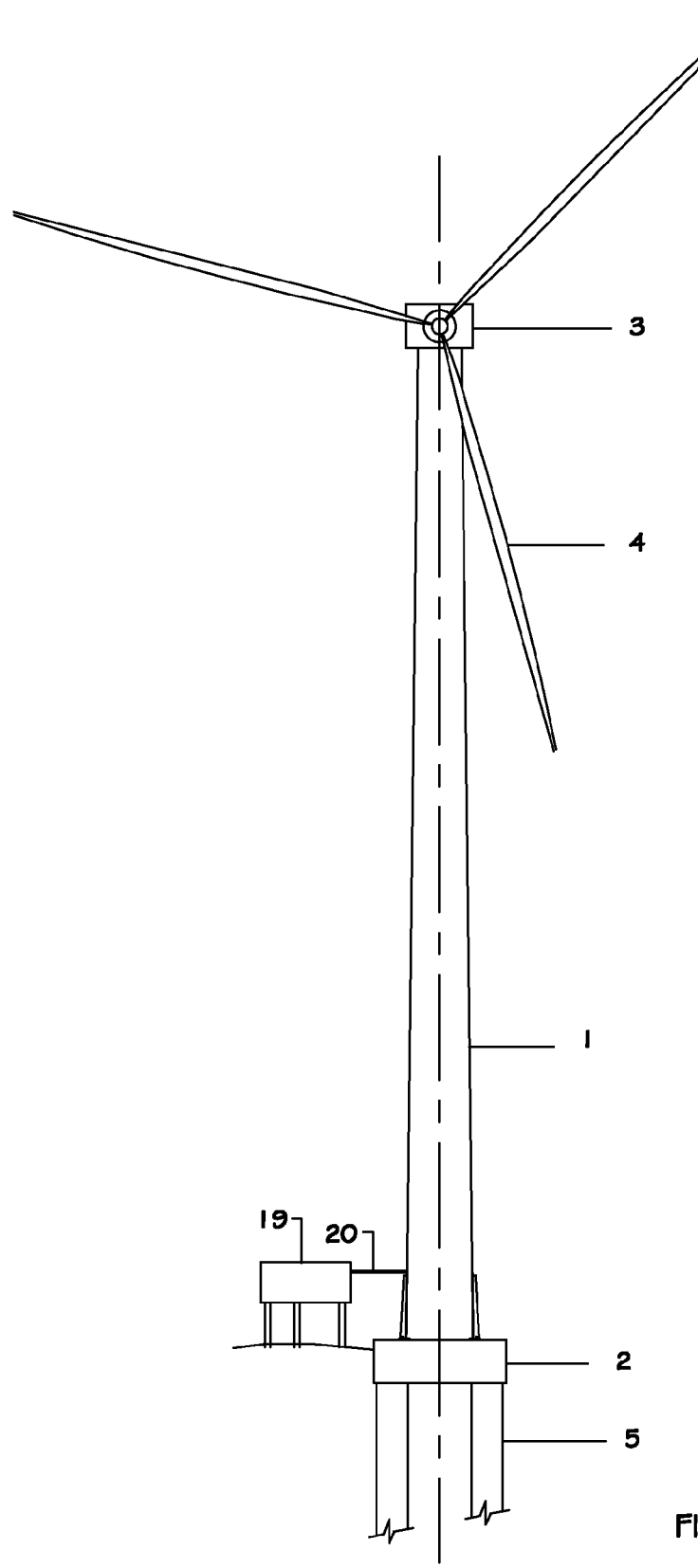
FIG. 1 is an elevational view of an energy-storing wind turbine according to an embodiment disclosed in the present application.

FIG. 1 shows a wind turbine energy storage system according to an embodiment disclosed in the present application. The wind turbine energy storage system may include a hollow wind turbine tower shaft 1 having a top end and a bottom end. The hollow wind turbine tower shaft 1 can be supported by a reinforced concrete pile cap 2 and a plurality of vertical concrete piles 5, details of which will be described later. The wind turbine tower shaft 1 can provide load carrying function to support a nacelle 3 and a plurality of turbine blades 4 of the wind turbine.

Electricity generation can be achieved by a turbo expander-generator 19 which is located adjacent to the wind turbine tower shaft 1. Compressed air stored in the hollow wind turbine tower shaft 1 can be fed into the turbo expander-generator 19 through a high pressure pipe 20 to generate electricity on demand or on a fixed schedule.

The hollow wind turbine tower shaft 1 may be made of steel or any other suitable material. According to the illustrated embodiment, the hollow wind turbine tower shaft 1 is generally cylindrical in shape and is circular in cross section. The height of the tower shaft 1 is dependent on the size of turbine blades 4 or the desired capacity of the output. The output of the wind turbine consists of two stages. The first stage is a compression cycle where the generated compressed air is stored in the hollow wind turbine tower shaft 1. The second stage is an electricity generation stage where the compressed air is utilized to push a turbo expander to generate electricity in constant output and at constant frequency.

The amount of energy stored depends on the stored air pressure and the volume provided by the hollow wind turbine tower shaft. The fluctuation of the wind electricity is thus almost eliminated. If the wind turbine produces the compressed air directly without the need to firstly produce electricity, the turbine efficiency can be improved because the upper band wind speeds (those greater than 12 m/s) can still be used to produce compressed air whereas most of the wind turbine that outputs electricity would require the wind turbine to start to shed extra wind energy at the upper band wind speeds (>12 m/s).

Figure 2:
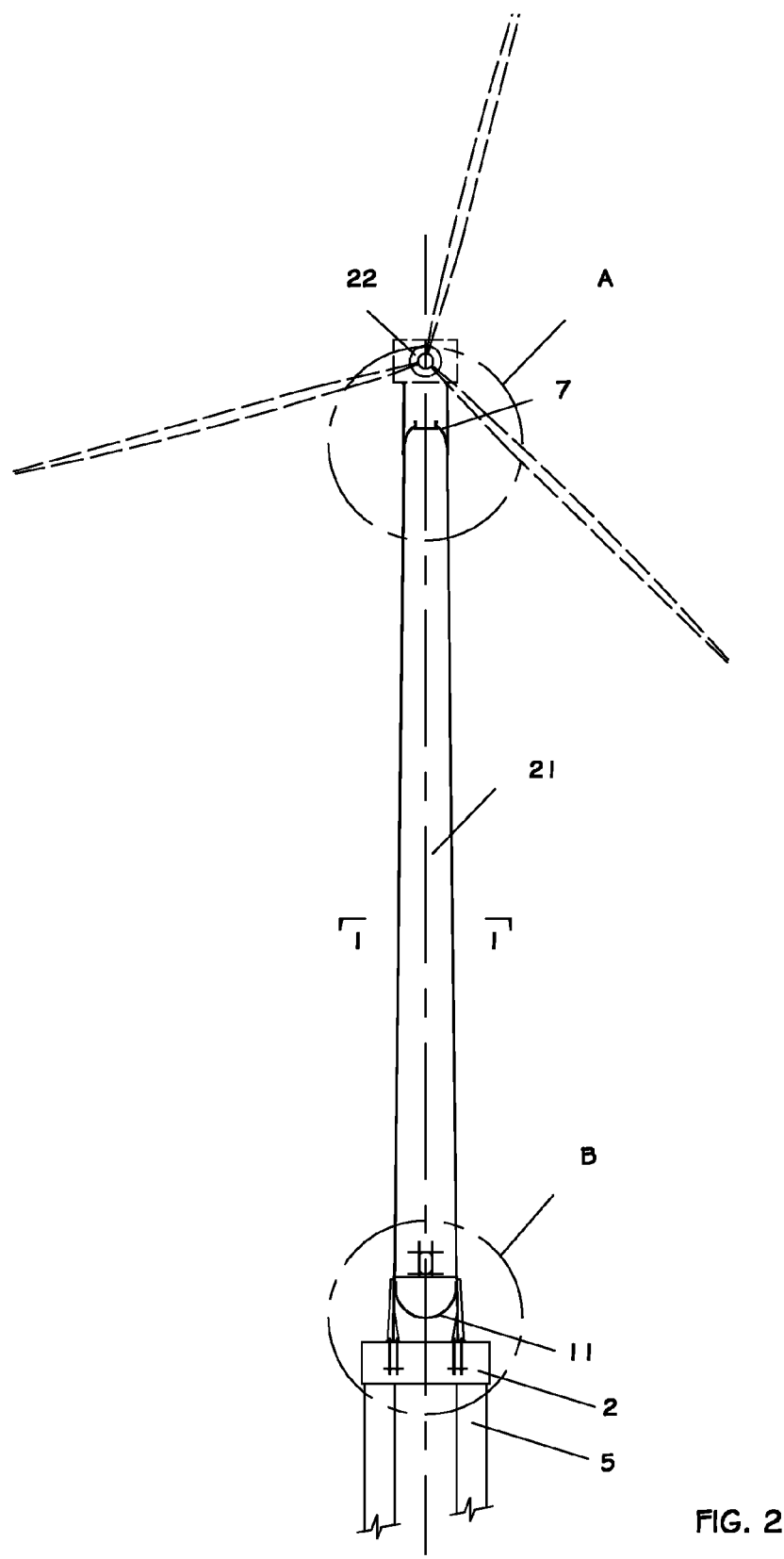
FIG. 2 is a vertical cross sectional view of a hollow shaft of the energy-storing wind turbine of FIG. 1.

FIG. 2 shows a vertical cross section of the hollow wind turbine tower shaft 1. According to the illustrated embodiment, the hollow wind turbine tower shaft 1 is in the shape of a tapered cylinder tapering upwards. To give a self balanced internal pressure situation, the top and bottom ends of the hollow wind turbine tower shaft 1 are capped or covered by top and bottom end caps 7, 11 respectively to form a tank 21. Since the tower shaft 1 tapers upwards, the dimension of the bottom end cap 11 is larger than the dimension of the top end cap 7.

According to the illustrated embodiment, the top and bottom end caps 7, 11 are hemispherical in shape, although the top and bottom end caps 7, 11 can be in any other appropriate shape. The top and bottom end caps 7, 11 may be made of steel or any other suitable material. It is appreciated that the internal pressure inside the tank 21 does not put any load on the foundation of the wind turbine except for the weight of the compressed air, which is small compared with the steel tower shaft 1.

The wind turbine energy storage system may include a compressor 22. The compressor 22 may be coupled to the wind turbine. It is understood by one skilled in the art that compressed air can be produced by the wind turbine directly driving the compressor 22, or compressed air can be produced by an electric compressor driven by electricity generated by the wind turbine. Air can be compressed into the tank 21 by the compressor 22 through a high pressure pipe and valve assembly.

Since compressed air is stored in the tank 21, safety measures should be exercised to ensure the safety of the wind turbine energy storage system disclosed in the present application. Safety measure may include one or more conventional pressure gauges that can release compressed air from the tank 21 when the air pressure inside the tank 21 reaches a first preset limit. This type of pressure gauge releases compressed air when the first preset limit is reached and the gauge returns to its normal position after air pressure drops back below the first preset limit.

A second line of safety precaution can be a destructive device with definite failure pressure load and can only be used once. At a second preset limit, which is higher than the first preset limit, a built-in weak point formed on the wall of the hollow wind turbine tower shaft 1 can yield and break to release the compressed air inside the tank 21. The destructive device can be replaced after activated.

Another safety consideration is that the access to the compression zone or the tank 21 is possible only after de-compression of the tank 21 and the air pressure inside the tank 21 is equal to the outside atmospheric pressure. It can be contemplated that all the access doors 10, 17 provided on the tank 21 can open inwards only and are restrained from opening outwards so as to prevent object from blowing away.

Figure 3A:
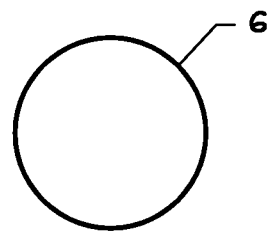
FIG. 3a is a cross sectional view of the hollow shaft of the energy-storing wind turbine taken along line 1-1 in FIG. 2.
Figure 3B:
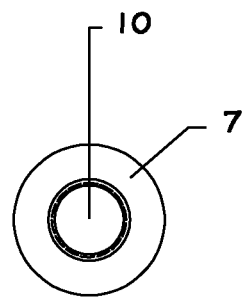
FIG. 3b is a cross sectional view of the hollow shaft of the energy-storing wind turbine taken along line 2-2 in FIG. 3c.
Figure 3C:
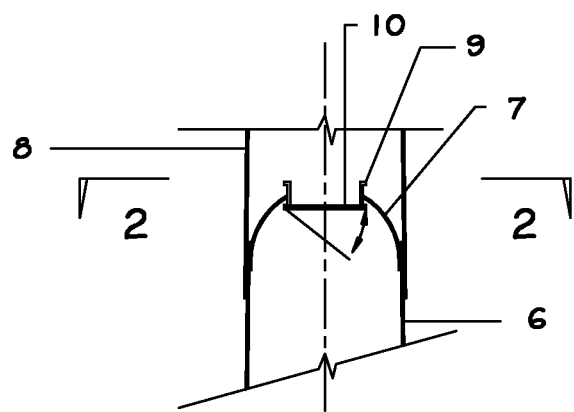
FIG. 3c is a detailed cutaway view of the upper end A of the hollow shaft of the energy-storing wind turbine in FIG. 2.

FIGS. 3*a*, 3*b* and 3*c* show the detailed structures of the top end A of the hollow wind turbine tower shaft 1 in FIG. 2. FIG. 3*a* depicts a cross section of a shaft wall 6 of the hollow wind turbine tower shaft 1. The shaft wall 6 at the top end of the wind turbine tower shaft 1 can be welded to the hemispheric top end cap 7, as illustrated in FIGS. 3*b* and 3*c*. An opening can be formed at the top of the hemispheric top end cap 7. The opening may be circular in shape and can be stiffened by a ring beam 9 fixed around the opening.

A one-way top access door 10 can be hingedly connected to the ring beam 9. The one-way top access door 10 can be in the form of a hinged door movable between a closed position where the top access door 10 closes the opening and an open position where the top access door 10 pivots inwards when the tank 21 is decompressed and the air pressure inside the tank is the same as the outside atmospheric pressure. The top access door 10 may be used to access the nacelle 3 of the wind turbine mounted on top of the hollow wind turbine tower shaft 1.

A non-compression zone is defined by a top hollow tower shaft extension 8 which is connected to and extending upwardly from the top end of the hollow wind turbine tower shaft 1. The top hollow tower shaft extension 8 directly supports the nacelle 3 and the turbine blades 4 of the wind turbine.

Figure 4A:
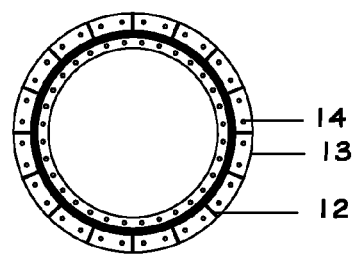
FIG. 4a is a cross sectional view of the hollow shaft of the energy-storing wind turbine taken along line 3-3 in FIG. 4b.
Figure 4B:
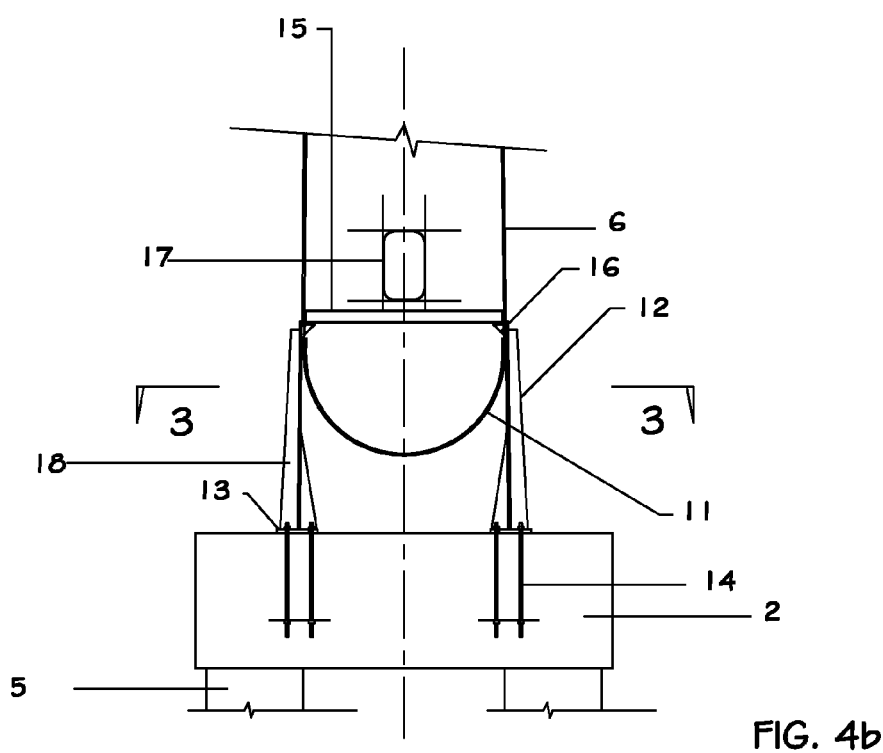
FIG. 4b is a detailed cutaway view of the lower end B of the hollow shaft of the energy-storing wind turbine in FIG. 2.

FIGS. 4*a* and 4*b* show the detailed structures of the bottom end B of the hollow wind turbine tower shaft 1 in FIG. 2. As illustrated in FIG. 4*b*, the shaft wall 6 at the bottom end of the wind turbine tower shaft 1 can be welded to the hemispheric bottom end cap 11 and a bottom hollow tower shaft extension 18. The bottom hollow tower shaft extension 18 can be connected to and extending downwardly from the bottom end of the hollow wind turbine tower shaft 1 for supporting the tower shaft 1.

The bottom hollow tower shaft extension 18 can be stiffened by a plurality of vertical stiffeners or plates 12 fixed around an outer surface of the bottom hollow tower shaft extension 18. The bottom hollow tower shaft extension 18 and the plurality of vertical plates 12 can be welded to a bearing ring plate 13. Through the ring plate 13, the bottom hollow tower shaft extension 18 can be fixed on top of the concrete pile cap 2 by a plurality of anchor bars 14. The concrete pile cap 2 can in turn be supported on the plurality of vertical concrete piles 5 embedded in the ground, as best illustrated in FIG. 1.

A plurality of horizontal working platforms may be mounted at different levels inside the tower shaft 1. The plurality of horizontal working platforms can be supported from the inner surface of the tower shaft by brackets in a simple bending mode, and can be perforated to allow air flowing between the two faces of the platform. A ladder may extend from the ground, leading to the working platforms, up to the top access door 10 and into the nacelle 3 through a nacelle access door.

According to the illustrated embodiment, a bottom working platform 15 can be mounted horizontally inside the tower shaft 1 at the bottom end thereof. The bottom working platform 15 can be supported by a plurality of brackets 16 fixed on the inner surface of the tower shaft 1 at a position above the bottom end cap 11 in a simple bending mode. The bottom working platform 15 can be perforated to allow air flowing in and out of the hemispheric space below the bottom working platform 15.

A one-way bottom access door 17 may be provided on the shaft wall 6 of the tower shaft 1 at a position above the bottom end cap 11 for accessing to the bottom working platform 15. The one-way bottom access door 17 can be a hinged door movable between a closed position where the bottom access door 17 closes the tank 21, and an open position where the bottom access door 17 pivots inwards when the tank 21 is decompressed and the air pressure inside the tank 21 is the same as the outside atmospheric pressure.

The top and bottom access doors 10, 17 can allow a person to access the interior of the tank 21 and the nacelle 3 for repair and maintenance. For safety reasons, the access doors 10, 17 provided on the tank 21 can open inwards only and are restrained from opening outwards.

The method of storing energy in a wind turbine is to equip a wind turbine with an energy storage system that takes in compressed air. It suits particularly well with wind turbine that produces compressed air than electricity. According to the illustrated embodiment, a hollow wind turbine tower shaft 1 having a top end and a bottom end is provided. The top end and the bottom end are covered by the top and bottom end caps 7, 11 respectively to form the tank 21. Air can be compressed into the tank 21 through a high pressure pipe and valve assembly by the compressor 22 which can be driven by the wind turbine. Compressed air can be collected and stored in the tank 21.

The stored compressed air in the tank 21 can be released to the turbo expander-generator 19, or similar devices, through the high pressure pipe 20 to produce electricity on demand, or simply on a fixed schedule with the intermittent nature of the wind energy output to be averaged over a time duration giving a more stable and constant output than with turbine without storage. This can enhance the quality of electricity output to be more acceptable to gird operators and that larger percentage of wind produced electricity can be admitted into the grid.

For example, the hollow wind turbine tower shaft 1 of the following particulars is investigated of the storage capacity:

| Bottom diameter | 6 m |
| Top diameter | 4 m |
| Height | 100 m |

Turbine rating 2.5 MW, Capacity Factor CP = 0.3

Internal volume is 1571 m³ approx. and supposes the chosen working air pressure is between 10 and 30 bars, the stored energy in one cycle of pressure change is:

(1571)×(3.0−1.0)=3142 MJ

For a 2.5 MW turbine with capacity factor 0.3, it produces 0.30×2.5=0.75 MW or 0.75 MJ/s. The storage can store 3142/0.75=4189 sec, i.e. 1.0 hour. This means that the electricity is as if it is produced by a wind speed of one hour average. The one hour average wind speed is definitely more stable than a wind speed of 1 sec. duration. It is appreciated that higher working pressure will lead to longer average time duration.

The hollow wind turbine tower shaft 1 is subject to wind load induced bending stress and shear stress in the shaft. The bending stress is normal stress and is in the shaft axial direction. Usually the critical stress is in the bending stress. Assuming this stress approach to critical value fb, the normal stress in the transverse direction can be approximated by 0.3fb due to the Poisson's ratio effect. The shear stress is not critical.

The internal air pressure produces normal stress in the transverse and axial direction without shear stress. Therefore, the shear stress remains unchanged. For an internal pressure of P and a shaft radius R, and a plate thickness t, the transverse and axial stress, according to Timoshenko and Woinowsky-Kriegers, "Theory of Plate and Shell", McGraw-Hill Book Co., $2^{nd}$ ED., N.Y., 1959, are R*P/t=fp and R*P/(2·t)=0.5fp respectively. Total stress is the sum of

| Axial direction | fb + 0.5 fp |
| Transverse direction | 0.3 fb + fp |

Closely examining the stress calculation reveals that when the shaft is loaded by wind and internal pressure simultaneously, the maximum stress is not the arithmetic sum of two individual maximum stresses, i.e. the maximum value is not fb+fp but at the most is either fb+0.5fp or 0.3fb+fp. Instead of building two structures with one to support the wind turbine (plate thickness Tb to resist stress fb) and the other one being the container for compressed air (plate thickness Tp to resist fp), saving in steel and in construction cost is achievable by combining these two structures together (plate thickness less than Tb+Tp is required to resist either fb+0.5fp or 0.3fb+fp). Economic gain is definitely possible.

While the wind turbine disclosed in the present application has been shown and described with particular references to a number of preferred embodiments thereof, it should be noted that various other changes or modifications may be made without departing from the scope of the appending claims.

What is claimed is:

1. A wind turbine energy storage system, comprising: a hollow, cylindrical wind turbine tower shaft having a top end and a bottom end, hemispherical-shaped top and bottom end caps attached near the top and bottom ends of the tower shaft respectively to form a tank in the tower shaft, the tower shaft including a top hollow tower shaft extension connected to and extending upwardly from the top end cap and having substantially the same diameter as that of the hemispherical-shaped top end cap, the top shaft extension directly supporting a nacelle and a plurality of turbine blades of a wind turbine, and the tower shaft including a bottom hollow tower shaft extension connected to and extending downwardly from the bottom end cap and having substantially the same diameter as that of the hemispherical-shaped bottom end cap, the bottom shaft extension supporting the tower shaft with the tank; and a compressor coupled to the wind turbine for compressing air into the tank, wherein compressed air stored in the tank is adapted to be released on demand or on a fixed schedule.

2. The system as claimed in claim 1, wherein the hollow wind turbine tower shaft tapers upwards, and a dimension of the bottom end cap is larger than a dimension of the top end cap.

3. The system as claimed in claim 1, wherein the bottom hollow tower shaft extension is stiffened by a plurality of vertical plates fixed adjacent an outer surface of the bottom hollow tower shaft extension, and wherein the bottom hollow tower shaft extension and the vertical plates are welded to a bearing ring plate which is fixed on top of a concrete pile cap by a plurality of anchor bars, and the concrete pile cap is in turn supported on a plurality of vertical concrete piles embedded in the ground.

4. The system as claimed in claim 1, further comprising a high pressure pipe and valve assembly through which air is delivered from the compressor into the tank.

5. The system as claimed in claim 1, further comprising a turbo expander-generator to which compressed air in the tank is fed through a high pressure pipe.

6. The system as claimed in claim 1, further comprising a top access door provided on the top end cap, wherein the top access door is a one-way hinged door movable inwards when air pressure inside the tank is the same as the outside atmospheric pressure.

7. The system as claimed in claim 6, wherein the top end cap is provided with a circular opening reinforced by a ring beam fixed thereto, and the top access door is adapted to cover the circular opening.

8. The system as claimed in claim 1, further comprising a bottom access door provided on the tower shaft at the bottom end thereof, wherein the bottom access door is a one-way hinged door movable inwards when air pressure inside the tank is the same as outside atmospheric pressure.

9. The system as claimed in claim 8, further comprising a bottom working platform mounted inside the tower shaft at the bottom end thereof and accessible from the bottom access door.

10. The system as claimed in claim 1, further comprising a plurality of horizontal working platforms mounted at different levels inside the tower shaft and supported by a plurality of brackets fixed on an inner surface of the tower shaft.

11. The system as claimed in claim 10, further comprising a ladder extending from the ground, leading to the working platforms, up to an access door provided on the top end cap and into the nacelle of the wind turbine.

12. The system as claimed in claim 1, further comprising a pressure gauge provided on the tank for releasing compressed air therefrom when air pressure in the tank reaches a first preset limit.

13. The system as claimed in claim 12, further comprising a built-in weak point formed on the tank, wherein the weak point breaks to release the compressed air in the tank when the air pressure in the tank reaches a second preset limit that is higher than the first preset limit.

14. The system as claimed in claim 1, wherein the hollow wind turbine tower shaft and the top and bottom end caps are made of steel.

15. The system of claim 1, wherein the wind turbine has a rating of at least 2.5 MW and a capacity factor of at least 0.3.

16. The system of claim 1, wherein the compressor compresses air into the tank at a working pressure of at least 10 bar.

17. The system of claim 1, wherein
there is a gap in the top shaft extension between the top end cap and where the nacelle and turbine blades are connected to the top shaft extension, and
there is a gap in the bottom shaft extension between the bottom end cap and a concrete pile cap on which the bottom end of the wind turbine tower shaft sits.

18. The system of claim 1, wherein the top and bottom hollow tower shaft extensions are not stressed due to internal pressure on the tank.

19. A wind turbine energy storage system, comprising: an upwardly tapered, cylindrical, steel wind turbine tower shaft, a pair of spaced hemispherical top and bottom steel end caps attached near respective top and bottom ends of the tower shaft, the spaced hemispherical end caps defining a cylindrical tank portion of the tower shaft, an upper tower shaft extension connected to the top end cap, having substantially the same diameter as that of the hemispherical top end cap, and extending upward from the top end cap, a lower tower shaft extension connected to the bottom end cap, having substantially the same diameter as that of the hemispherical bottom end cap, and extending downward from the bottom end cap, and a compressor coupled to a wind turbine for compressing air into the tank portion of the tower shaft at a working pressure of at least 10 bar, the wind turbine having a rating of at least 2.5 MW.

20. The system of claim 19, wherein the upper shaft extension directly supports a nacelle and a plurality of turbine blades of the wind turbine, and the lower shaft extension supports the tower shaft with the tank portion.

21. The system of claim 19, wherein there is a gap in the lower shaft extension between the bottom end cap and a concrete pile cap on which the bottom end of the wind turbine tower shaft sits.

22. The system of claim 19, wherein there is a gap in the upper shaft extension between the top end cap and where the nacelle and turbine blades of the wind turbine are connected to the upper shaft extension.

23. The system of claim 19, wherein each of the upper and lower tower shaft extensions are hollow.

24. A wind turbine energy storage system, comprising: a cylindrical, wind turbine tower shaft, a pair of spaced hemispherical top and bottom end caps attached near respective top and bottom ends of the tower shaft, the spaced hemispherical end caps defining a cylindrical tank portion in the tower shaft, an upper tower shaft extension connected to the top end cap, having substantially the same diameter as that of the hemispherical top end cap and extending upward from the top end cap, a gap in the upper shaft extension provided between the top end cap and where a nacelle and turbine blades of a wind turbine are directly supported by the upper shaft extension, a lower tower shaft extension connected to the bottom end cap, having substantially the same diameter as that of the hemispherical bottom end cap and extending downward from the bottom end cap to a concrete pile cap, a gap in the lower shaft extension provided between the bottom end cap and the concrete pile cap on which the bottom end of the wind turbine tower shaft sits, and a compressor coupled to the wind turbine for compressing air into the tank portion of the tower shaft, wherein compressed air stored in the tank is adapted to be released on demand or on a fixed schedule.

* * * * *